United States Patent [19]
Chaki et al.

[11] Patent Number: 5,646,966
[45] Date of Patent: Jul. 8, 1997

[54] METHOD AND APPARATUS FOR DETECTING SYNCHRONIZING SIGNALS BY LATCHING SUCCESSIVED COUNT VALUES THAT REPRESENT TIME BETWEEN RECEIVED SYNC PULSES FOR COMPARISON TO A PREDETERMINED SYNC PATTERN OF COUNT VALUES

[75] Inventors: Yasuyuki Chaki; Hiroyuki Ino, both of Chiba, Japan

[73] Assignee: Sony Corporation, Tokyo, Japan

[21] Appl. No.: 84,860

[22] Filed: Jun. 29, 1993

[30] Foreign Application Priority Data

Jun. 30, 1992 [JP] Japan ................... 4-194578

[51] Int. Cl.⁶ .................................................. H04L 7/00
[52] U.S. Cl. ........................ 375/368; 375/340; 375/360; 327/23; 364/715.11
[58] Field of Search .......................... 375/365, 368, 375/359, 355, 360, 364, 367, 366, 374, 373, 375, 236, 229, 340, 343, 346, 350, 351; 370/105.1, 105.4, 105.5, 108, 106; 348/513; 371/42, 46; 327/22, 24, 23; 364/715.11

[56] References Cited

U.S. PATENT DOCUMENTS

| | | | |
|---|---|---|---|
| 4,412,301 | 10/1983 | Strubeck | 364/728 |
| 4,747,116 | 5/1988 | Yagima et al. | 375/365 |
| 4,759,040 | 7/1988 | Kawata et al. | 375/368 |
| 4,763,341 | 8/1988 | Murphy | 377/20 |
| 4,813,006 | 3/1989 | Burns et al. | 364/604 |
| 5,042,054 | 8/1991 | Yoon | 375/357 |
| 5,062,011 | 10/1991 | Hase et al. | 360/40 |
| 5,463,645 | 10/1995 | Nagashima | 371/67.1 |
| 5,487,090 | 1/1996 | Ide | 375/316 |

FOREIGN PATENT DOCUMENTS

| | | | |
|---|---|---|---|
| 0 203 592 A2 | 12/1986 | European Pat. Off. | G11B 27/30 |
| 0 455 267 A3 | 11/1991 | European Pat. Off. | G11B 20/14 |

OTHER PUBLICATIONS

Patent Abstracts of Japan, vol. 11, No. 70 (E-485) (2517), 3 Mar. 1987 & JP-A-61 225 920 (Toshiba), 7 Oct. 1986.

*Primary Examiner*—Wellington Chin
*Assistant Examiner*—William Luther
*Attorney, Agent, or Firm*—Limbach & Limbach L.L.P.

[57] ABSTRACT

A synchronization signal detector for detecting synchronization signals or frame synchronization signals recorded on a recording medium includes a binary-valued signal detector for translating RF signals into binary-valued signals, an edge detection circuit for extracting edge portions of the binary-valued signals, a counter for counting the number of clocks generated by an external source between the edge portions, a number of latch circuits for holding successive clock count values between the edge portions and for successively shifting the clock values held by them, value coincidence circuits for comparing the numbers of clocks between transitions of the synchronization patterns and the clock count values held by the counter and the latch circuits and for outputting a signal indicating a coincidence in case of complete coincidence between the numbers of clocks and the clock count values and an AND circuit for taking a logical sum of the outputs of the value coincidence circuits and the edge detector for producing a detection output of the synchronization signal. The synchronization signal may be detected efficiently with a short delay time and by a simple circuit construction even if the synchronization signal pattern is of a longer length. A demodulator utilizing the synchronization signal detector is also disclosed.

10 Claims, 6 Drawing Sheets

METHOD AND APPARATUS FOR DETECTING SYNCHRONIZING SIGNALS BY LATCHING SUCCESSIVED COUNT VALUES THAT REPRESENT TIME BETWEEN RECEIVED SYNC PULSES FOR COMPARISON TO A PREDETERMINED SYNC PATTERN OF COUNT VALUES

BACKGROUND OF THE INVENTION

1. Field of the Invention

This invention relates to a synchronization signal detector for detecting synchronization signals or frame synchronization signals recorded on a recording medium, a method for detecting synchronization signals, and a demodulator for demodulating the data stored on a recording medium.

2. Description of the Prior Art

Figure 6:
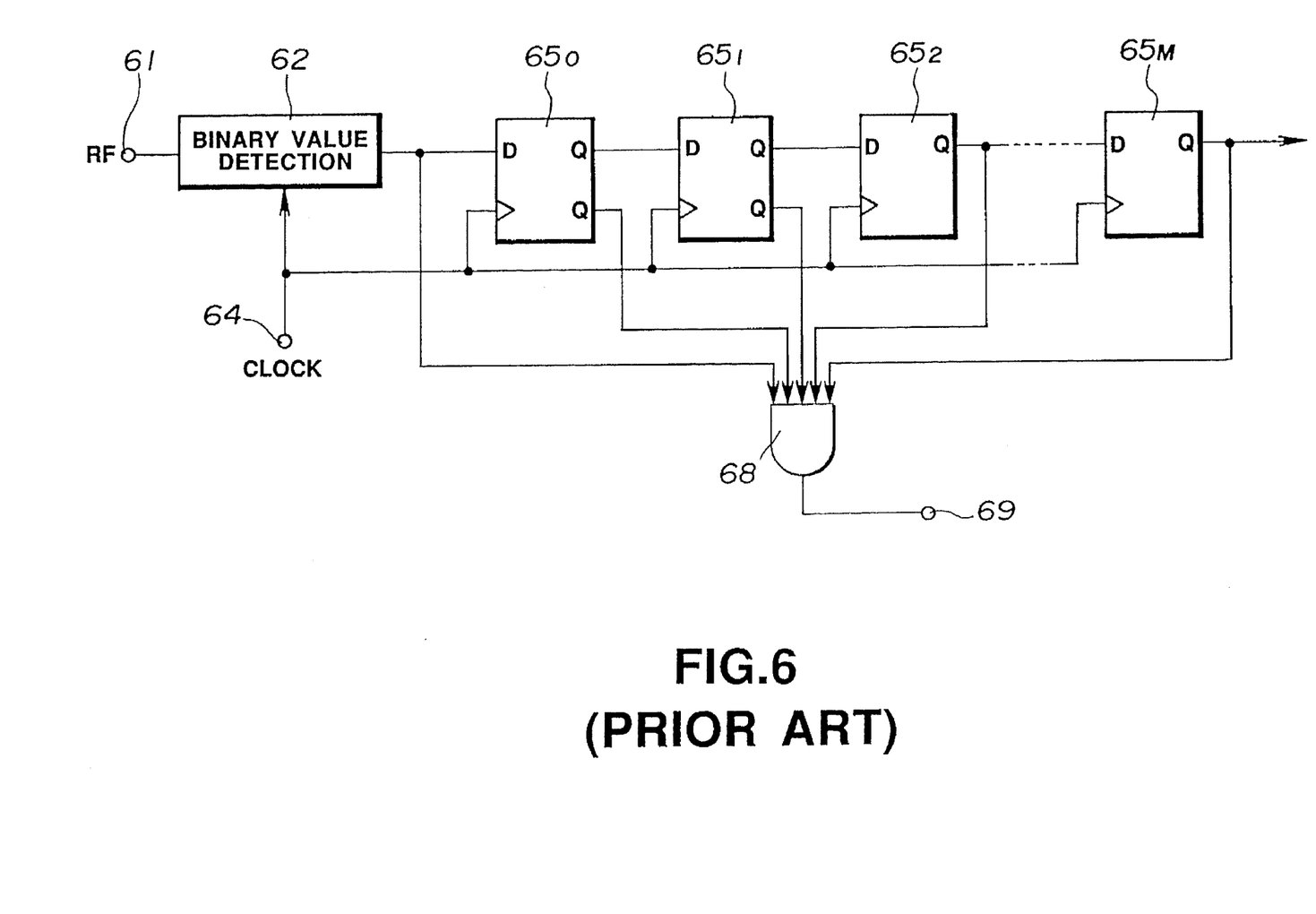
FIG. 6 is a block circuit diagram for illustrating an arrangement of a conventional synchronization signal detector.

On a recording medium, such as an optical disc, magnetic disc, or a magneto-optical disc, synchronization signals (frame synchronization signals, synchronization patterns, sync patterns) are usually recorded so as to be employed later for signal reproduction. In a conventional arrangement for detecting these synchronization signals, as shown in FIG. 6, a number of D type (data type) flip-flops $65_0$ to $65_M$ corresponding to the length of the pattern of the synchronization signal are arrayed. That is, a number of the D flip-flops equal to the bit length of the synchronization signal are arrayed. Outputs of the D-flip-flops, in the form of a suitable pattern corresponding to the synchronization pattern, are ANDed by an AND gate 68 to decide whether or not the input signal is the synchronization signal.

RF signals produced by an optical pickup from reading pits or from signal recording regions on a recording media, such as an optical disc or a magneto-optical disc, or RF signals produced by a magnetic head reading the pits or the recording regions on a media surface, are supplied to an input terminal such as input terminal 61 in FIG. 6.

These RF signals are supplied to a binary value detector 62, operated on the basis of clock signals supplied thereto from a terminal 64, for translating the input RF signals into binary-valued signals based on predetermined signal levels as threshold levels.

The output binary-valued signals from the binary-valued signal detector 62 are transmitted to a number of series-connected D flip-flops $65_0$ to $65_M$ corresponding to the length M of the pattern of the synchronization signal to be detected. From these D-flip-flops $65_0$ to $65_M$, operated by the clock signals, non-inverted output signals or inverted output signals, corresponding to the pattern of the synchronization signal prescribed by the relevant format, are output, depending on the "H" active or "L" active state of the circuitry as selected in accordance with the synchronization pattern prescribed by the format.

The non-inverted output or the inverted output from the D flip-flops $65_0$ to $65_M$ are supplied to the AND gate 68. The AND gate 68 takes a logical sum of the non-inverted or inverted outputs to output a signal indicating detection of the synchronization signal when the pattern of the binary-valued signals corresponding to the input RF signals becomes a pattern peculiar to the synchronization signal. This peculiar pattern is a pattern not appearing in any other data. The output signal from the AND gate 68 is output as a synchronization signal detection output at an output terminal 69.

It is noted that, if the original signal is in the form of non-return-to-zero inverted (NRZI) signals in which the signal state is inverted only when the bit information data is "1", and the synchronization pattern is in the form of non-return-to-zero (NRZ) signals such that the signal state is inverted at a boundary between the bit information data, an additional circuit similar to that shown in FIG. 6 needs to be provided side-by-side. An output of the additional circuit and an output of the circuit shown in FIG. 6 are ORed by an OR gate, not shown, to produce an OR output as a synchronization signal detection output.

In the above-described conventional arrangement for detecting the synchronization signals, plural synchronization signals of different patterns may be detected by arbitrarily combining outputs of the D flip-flops in conformity to various patterns peculiar to the synchronization signals.

However, if, with the above-described conventional arrangement for detecting the synchronization signals, the pattern length of the synchronization signal is increased, it becomes necessary to array an increased number of D flip-flops, leading to an increased circuit scale.

With the above-described arrangement, it is necessary to provide an AND gate having a number of inputs corresponding to the bit length of the synchronization signal pattern, leading to a further increased circuit size. If the AND gate is divided into plural AND gate elements for reducing the circuit size, delay times of the AND gate elements and associated circuit devices are accumulated to lower the speed demanded of the circuit elements.

If, in case of division of the AND gate, a D flip-flop, for example, is annexed as a latch for maintenance of the operating speed, delay times are similarly produced for synchronization signal detection in the same manner as described above.

OBJECT AND SUMMARY OF THE INVENTION

In view of the above-described status of the art, it is an object of the present invention to provide a synchronization signal detector and a method for detecting synchronization signals whereby the synchronization signal may be detected efficiently with a short delay time and by a simple circuit construction even if the synchronization signal pattern is of a longer length.

For accomplishing the above object, the present invention provides a synchronization signal detector comprising binary-valued signal detecting means for detecting binary-valued signals based on predetermined levels; edge detection means for producing a pulse train based on edge portions extracted from the detected RF signals; counting means for counting the clocks generated between the extracted edge portions; an N-number (where N is an integer) of latch means for holding the count values of clocks between the edge portions and transmitting the clock count values thus held to the next latch each time the transition of the RF signal occurs; an (N+1) number of comparator means for comparing the number of clocks generated between transitions of peculiar synchronization patterns with the clock count values held by the N-number of latch means and by the counting means, and for outputting a signal indicating a complete coincidence between the numbers of clocks between the detected edge portions and the clock count values of the distance between transitions of the synchronization patterns; and decision means for taking a logical sum of outputs of the (N+1) number of the comparator means and an output of said edge detection means to give a decision as to whether or not the signal transition pattern is coincident with the transition pattern of the synchronization signals.

The present invention also provides a synchronization signal detector comprising binary-valued signal detecting means for detecting binary-valued signals based on predetermined levels; edge detection means for producing a pulse train based on edge portions extracted from the detected RF signals; counting means for counting the clocks generated between the extracted edge portions; an N-number of latch means for holding the count values of clocks between the edge portions and transmitting the clock count values thus held to the next latch each time the transitions of the RF signals occur; an (N+1) number of comparator means for comparing the number of clocks generated between transitions of peculiar synchronization patterns with the clock count values held by the latch means and counting means, and for outputting a signal indicating the coincidence between the numbers of clocks between the edge portions and the clock count values of the distances between transitions of the synchronization pattern in case of a difference between the numbers of clocks and the clock count values being within a predetermined range; and decision means for taking a logical sum of outputs of the (N+1) number of the comparator means and an output of said edge detection means to give a decision as to whether or not the signal transition pattern is coincident with the transition pattern of the synchronization signals.

The present invention also provides a demodulator that uses the synchronization signal detector described in this disclosure.

The foregoing and other objectives, features and advantages of the invention will be more readily understood upon consideration of the following detailed description of certain preferred embodiments of the invention, taken in conjunction with the accompanying drawings.

DESCRIPTION OF THE PREFERRED EMBODIMENT

Referring to the drawings, preferred embodiments of the present invention will be explained in detail.

Figure 1:
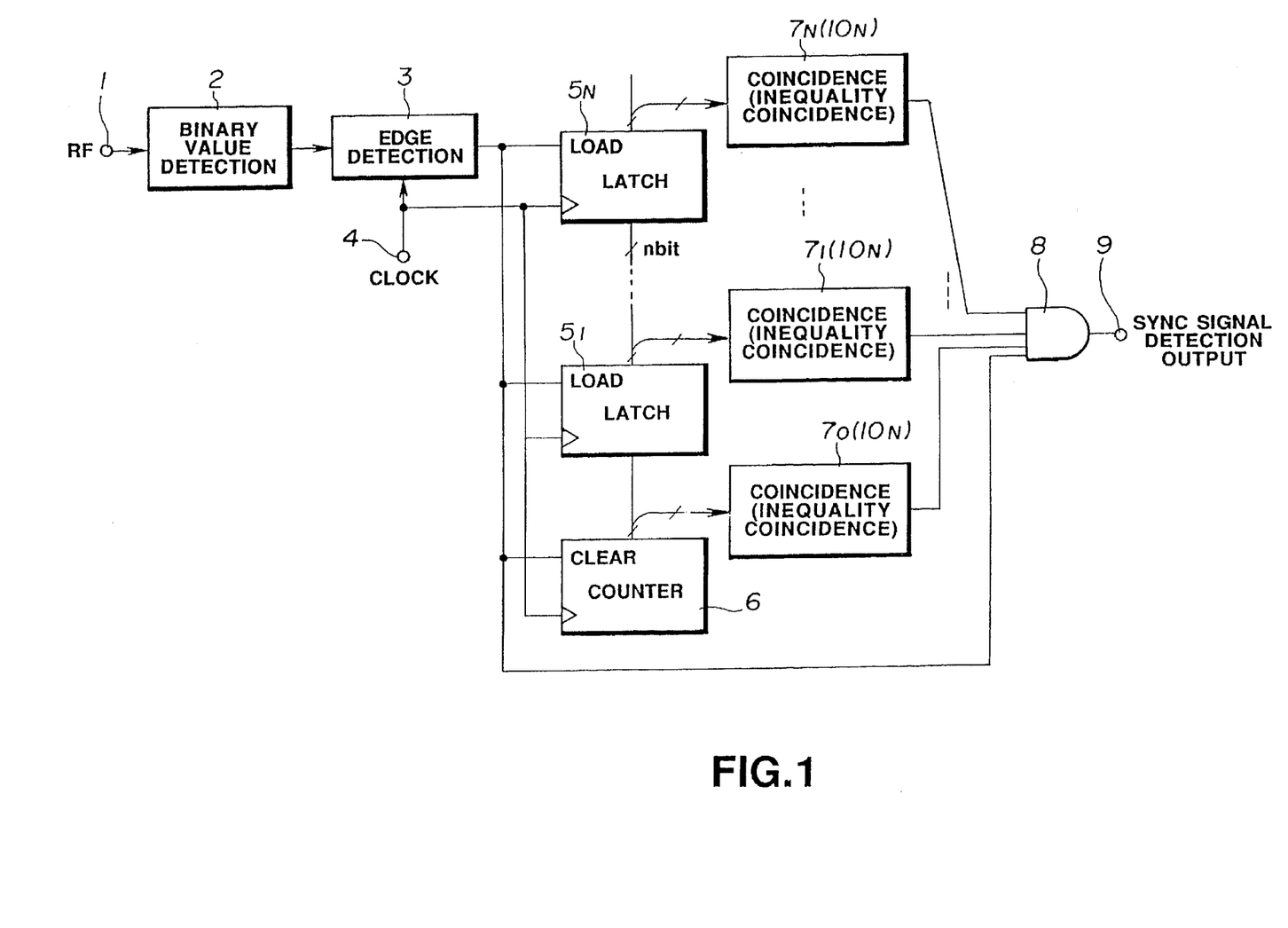
FIG. 1 is a schematic block circuit diagram showing a synchronization signal detector according to an embodiment of the present invention.

As shown in FIG. 1, a synchronization signal detector according to preferred embodiment of the present invention, employed for carrying out the method for detecting synchronization signals according to the present invention, includes a binary-valued signal detector 2 for detecting binary-valued signals based on predetermined levels; an edge detector 3 for producing a pulse train based on edge portions extracted from the detected RF signals; a counter 6 for counting the clocks generated between the extracted edge portions; an N-number of latch circuits $5_1$ to $5_N$ for holding the count values of clocks between the edge portions and transmitting the clock count values thus held to the next latch each time the transition of the RF signal occurs; an (N+1) number of value coincidence circuits $7_0$ to $7_N$ as comparator means for comparing the numbers of clocks generated between transitions of the synchronization pattern and the clock count values held by the latch circuits $5_1$ to $5_N$ and the counter 6 and for outputting a signal indicating the coincidence between the numbers of clocks between the edge portions and the clock count values of the distances between transitions of the synchronization pattern in case of complete coincidence between the two numbers of clocks, and an AND gate 8 as decision means for taking a logical sum of outputs of the (N+1) number of value coincidence circuits $7_0$ to $7_N$ and a output of the edge detector 3 to give a decision as to whether or not the signal transition patterns are coincident with the all of the transition patterns of the synchronization signal.

The number of the latch circuits $5_1$ to $5_N$ is selected to be equal to one less than the number of transitions of the synchronization pattern.

Figure 2:
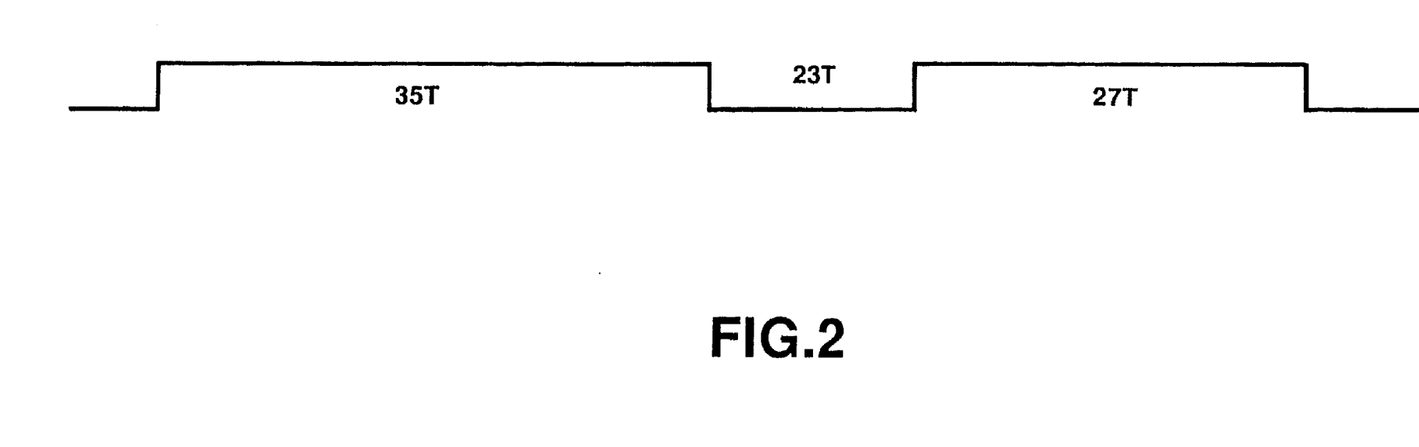
FIG. 2 is a waveform diagram showing an example of a synchronization signal pattern.

It is noted that the synchronization signal detector and the method for detecting synchronization signals according to the present invention are effective when the synchronization signal pattern has a longer length and the distances between the edges as viewed in the NRZI pattern following detection of the binary-valued signals are long, in other words, when the distances between edges as viewed in the NRZI pattern are long. An example of such pattern is shown in FIG. 2 in which the bit lengths are 35T, 23T and 27T.

Taking the synchronization pattern shown in FIG. 2 as an example, an arrangement of FIG. 1 is hereinafter explained by referring to FIGS. 3(a)–(g) showing the waveforms at various points and the clock count values.

Figure 3:
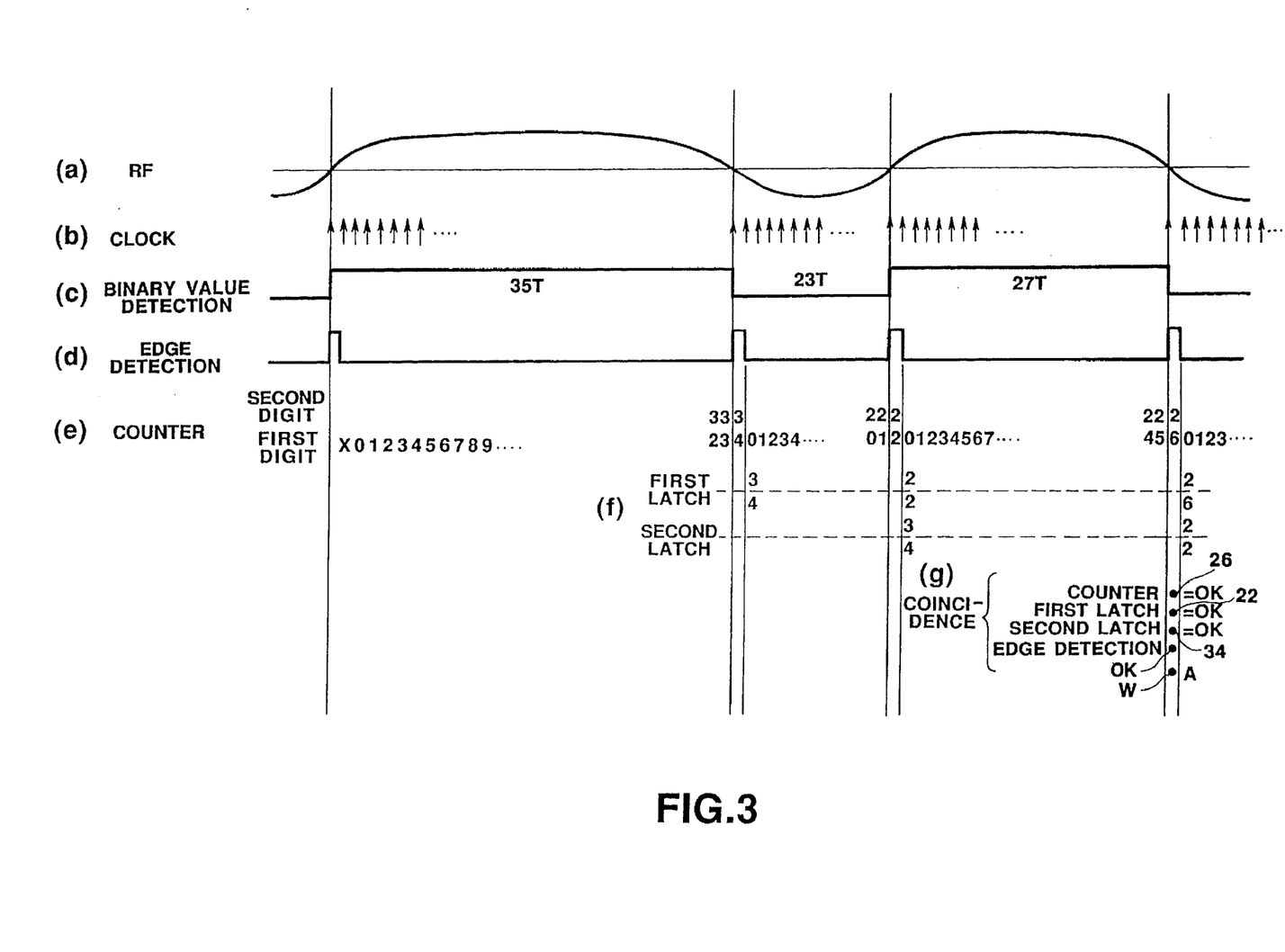
FIGS. 3(a), 3(b), 3(c), 3(d), 3(e), 3(f), and 3(g) are diagrams showing the signal waveform and the numbers of clocks for illustrating the operation of various parts of the detector shown in FIG. 1.

In the arrangement shown in FIG. 1, RF signals produced on reading pits or signal recording regions on the recording media, such as an optical disc or a magneto-optical disc, by an optical pickup, or RF signals produced on reading the pits or the recording regions on the magnetic head by a magnetic head, are supplied to an input terminal 1, as shown in FIG. 3(a).

These RF signals are supplied to a binary-valued signal detector 2 for translating the input RF signals into corresponding binary-valued signals based on the aforementioned predetermined levels as threshold levels. For example, the RF signal shown in FIG. 3(a) would be translated into the binary-valued detection signal shown in FIG. 3(c).

The binary-valued signals from the binary-valued signal detector 2 are transmitted to the aforementioned edge detector 3 which is operated on the basis of clocks from terminal 4 having clock timings as shown in FIG. 3(b). The edge detector 3 produces a pulse train from the edge portions extracted from the binary-valued signal produced by binary-valued signal detector 2. The edge detector 3 extracts edge portions of the binary-valued signals and generates edge detection signals shown in FIG. 3(d). These NRZI signals correspond to the edge portions of the binary-valued signals having the NRZ pattern.

The edge detection signals from edge detector 3 are supplied to a clear terminal of counter 6 and to load terminals of latch circuits $5_1$ to $5_N$, as well as to AND gate 8. Also, clocks from terminal 4 are supplied to clock terminals of counter 6 and latch circuits 51 to 5N.

The counter 6 has a count capacity capable of counting the number of clocks of the longest of the transition patterns of the synchronization signals to be detected and counts the number of clocks between the edges. The number of clocks counted is therefore the distance between transitions produced in the synchronization signal.

The latch circuits $5_1$ to $5_N$ play the role of holding the clock count values of counter 6 and of transmitting the count values held thereby to the next latch circuit each time a transition of the binary-valued signal is incurred. Thus the latch circuits $5_1$ to $5_N$ hold the hysteresis of the clock count values between transitions of the binary-valued signals.

The number of the latch circuits required corresponds to the number of transitions in the synchronization signal. Specifically, the number N of the latch circuits is equal to the number of transitions in the synchronization pattern minus one, as described above. Thus, with the present embodiment in which the synchronization pattern has three transitions, as shown in FIG. 2, N=2. These two latch circuits, a first latch circuit $5_1$ and a second latch circuit $5_2$, store the clock count values of counter 6, as shown in FIG. 3(f).

Outputs of counter 6 and latch circuits $5_1$ and $5_2$ are supplied to associated value coincidence circuits $7_0$ to $7_N$, respectively. These value coincidence circuits $7_0$ to $7_N$ compare the number of clocks between transitions of synchronization patterns and the respective clock count values, corresponding to the distances between the transitions, as stored by the latch circuits $5_1$ to $5_N$ and the counter 6, and outputs a signal indicating the coincidence between the numbers of clocks between the edge portions and the clock count values between transitions of synchronization patterns if the result of comparison indicates a complete coincidence. If the number N of the latch circuits is set to two as described above, the number (N+1) of the value coincidence circuits is 3.

In this manner, if the synchronization pattern as shown in FIG. 2 is employed, value coincidence circuit $7_0$, $7_1$ and $7_2$ of the value coincidence circuits $7_0$ to $7_N$, associated with the counter 6, latch circuit $5_1$, and latch circuit $5_2$, respectively, output value coincidence signals when the clock count values from counter 6, latch circuit $5_1$ and latch circuit $5_2$ are equal to 26, 22 and 34, respectively.

The outputs from these value coincidence circuits $7_0$ to $7_N$ are transmitted to AND gate 8 which is also supplied with an edge detection signal from edge detector 3. The AND gate 8 then takes the logical sum of the outputs of the value coincidence circuits $7_0$ to $7_N$ and the output of the edge detector 3 to give a decision as to whether or not the transition patterns of the binary-valued signal coincide with all of the transition patterns of the synchronization signal.

An output of the AND gate 8, indicating the coincidence of the transition patterns of the binary-valued signals output from the AND circuit 8 with all of the transition patterns of the synchronization signal, is output at output terminal 9 as a synchronization signal detection output of the present synchronization signal detector.

The last edge detection output from edge detector 3 is supplied to AND gate 8 for indicating that the 27T signal in the example of FIGS. 3(a)–(g) has come to an end. Should the last edge detection signal not be transmitted to AND gate 8, the synchronization signal detection output would be produced from the AND gate 8 even although the last signal is not the 27T signal but a 28T signal, so that a waveform of 35T-23T-28T would be decided to be a synchronization signal.

With the above-described embodiment, by providing a counter set or aggregate, consisting of a counter and a plurality of latch circuits, as the synchronization signal detector or a detector for detecting frame synchronization signals, it becomes possible to dispense with D flip-flops satisfying all of the synchronization patterns of the above-described conventional device, while it also becomes possible to have the inputs to the AND gate 8 distributed in advance because of localized constituent elements for detecting the distance between the transitions. The result is that the circuit scale may be diminished and the operating speed required of the circuit elements may be lowered. Thus it becomes possible with the present embodiment to find a synchronization signal in the binary-valued modulated code data which lasts for a longer period than a clock and which has longer distances between transitions in the reproduced detection values.

It may be occasionally desirable that the synchronization signals be detected with a certain allowance, that is that an allowance for certain ambiguities in the distance between transitions be afforded to the synchronization pattern. Although the synchronization signal may be detected with certain inaccuracy with the above-described mode of detection, such mode would be effective if the synchronization signals are desired to be detected to a certain extent even if the clock extraction system is not operating satisfactorily. In such case, inequality coincidence circuits may be substituted for the value coincidence circuits $7_0$ to $7_N$ of FIG. 1 to realize synchronization detection with a certain allowance in the synchronization signal detector.

Figure 4:
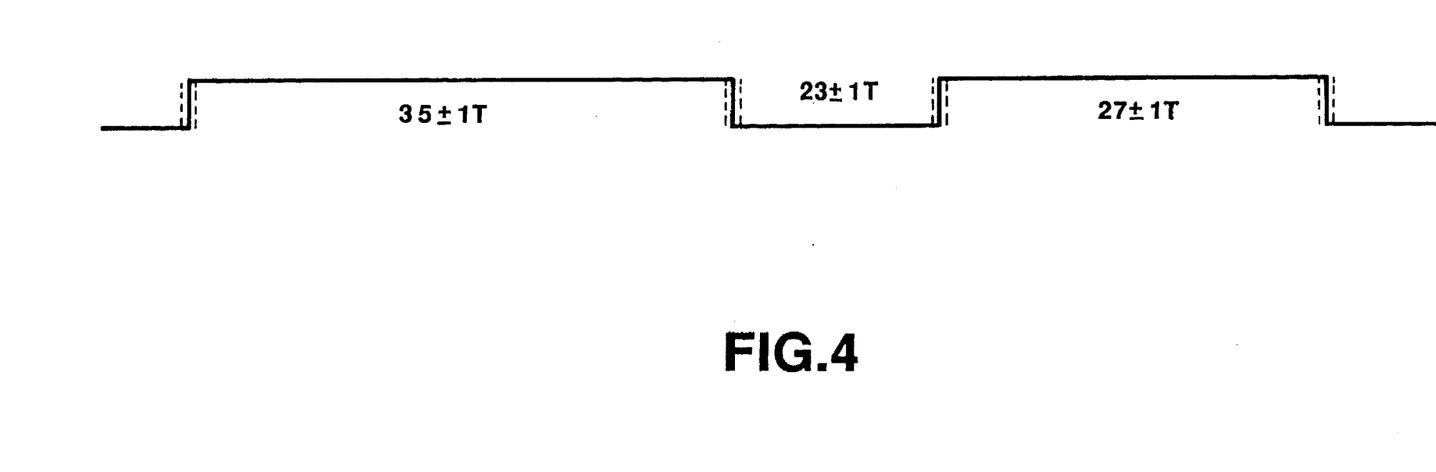
FIG. 4 is a waveform diagram for illustrating an allowance in detection of synchronization signals according to the present embodiment.

The constitution for the modified mode of detection is shown in FIG. 4 in common with the previously described embodiment and includes, as shown in FIG. 1, a binary-valued signal detector 2, for detecting binary-valued signals based on predetermined levels; an edge detector 3 for producing a pulse train based on edge portions extracted from the detected RF signals; a counter 6 for counting the clocks generated between the extracted edge portions; an N-number of latch circuits $5_1$ to $5_N$ for holding the count values of clocks between the edge portions and for transmitting the clock count values thus held to the next latch each time the transition of the RF signals occurs; an (N+1) number of inequality coincidence circuits $10_0$ to $10_N$ as comparator means, for comparing the numbers of clocks generated between transitions of the synchronization pattern and the clock count values held by the latch circuits $5_1$ to $5_N$ and the counter 6, and for outputting a signal indicating the coincidence between the number of clocks between the edge portions and the clock count values of the distances between transitions of the synchronization pattern in case the difference between the two numbers of clocks is within a certain range; and an AND gate 8 as decision means for taking a logical sum of outputs of the (N+1) number of inequality coincidence circuits $10_0$ to $10_N$ and an output of the edge detector 3 to give a decision as to whether or not the signal transition patterns are coincident with all of the transition patterns of the synchronization signals.

The present modified mode of detection differs from the previous embodiment in the constitution of the inequality coincidence circuits $10_0$ to $10_N$ operated in dependence upon the outputs of the counter 6 and the latch circuits $5_1$ to $5_N$. That is, the decision in the inequality coincidence circuits $10_0$ to $10_N$ is not given for a complete coincidence, as in the previous embodiment, but is given for a coincidence within a certain allowance range. Thus the detection of the synchronization signals is given with an allowance of ±1 with respect to the synchronization signal pattern shown in FIG. 2.

The modulation coding employed in the present invention is a variable length coding (d, k; m, n; r) having different code word lengths depending on input data word lengths.

The variable length coding is expressed as (d, k; m, n; r) in which d, k means a constraint imposed on a train of the same symbol information, d means the minimum length of a symbol "0", k means the maximum length of the symbol "0", m means the basic data length, n means the basic code length, n/m means a conversion ratio and r means the basic data length of conversion (constraint length). For example, the so-called 2-7RLL employed in a hard disc is expressed as (2, 7; 1, 2; 4) code.

Under the present embodiment, it is assumed that a (4, 22; 2, 5; 5) modulation code shown in Table 1 below is used as a (d, k; m, n; r) code. In such case, the synchronization signals are (21T, 23T) and (23T, 21T). The number of stages of the latch circuit is one and the numbers to be compared by the value or inequality coincidence circuits are (counter, latch)=(20, 22) or (22, 20). On the other hand, since the (d, k; m, n; r) code has two synchronization signals, the number of the value or inequality coincidence circuits to be provided is two for each of the latches and the counter.

TABLE 1

| | data | translation code |
|---|---|---|
| r = 1 | 11 | 00000 |
| | 10 | 10000 |
| | 111111 | 000010000100000 |
| r = 2 | 0111 | 0100000000 |
| | 0110 | 0010000000 |
| | 0101 | 0001000000 |
| | 0100 | 0000100000 |
| r = 3 | 001111 | 010000100000000 |
| | 001110 | 010000010000000 |
| | 001101 | 010000001000000 |
| | 001100 | 010000000100000 |
| | 001011 | 000100000100000 |
| | 001010 | 001000010000000 |
| | 001001 | 001000001000000 |
| | 001000 | 001000000100000 |
| | 000111 | 000100001000000 |
| r = 4 | 00011011 | 010000100001000000 |
| | 00011010 | 010000100000100000 |
| | 00011001 | 010000100000010000 |
| | 00011000 | 010000100000001000 |
| | 00010111 | 010000010001000000 |
| | 00010110 | 010000010000100000 |
| | 00010101 | 010000010000010000 |
| | 00010100 | 010000010000001000 |
| | 00010011 | 010000001000100000 |
| | 00010010 | 001000010000100000 |
| | 00010001 | 001000010000010000 |
| | 00010000 | 001000010000001000 |
| | 00001111 | 000100001000100000 |
| | 00001110 | 001000000100001000 |
| | 00001101 | 001000001000010000 |
| | 00001100 | 001000001000001000 |
| | 00001011 | 010000000100010000 |
| | 00001010 | 000010000100001000 |
| | 00001001 | 000100001000010000 |
| | 00001000 | 000100001000001000 |
| r = 5 | 0000011111 | 010000100001000010000000 |
| | 0000011110 | 010000100001000010000000 |
| | 0000011101 | 010000100001000001000000 |
| | 0000011100 | 010000100001000000100000 |
| | 0000011011 | 010000100000100001000000 |
| | 0000011010 | 010000100001000010000000 |
| | 0000011001 | 010000100001000001000000 |
| | 0000011000 | 010000100001000000100000 |
| | 0000010111 | 010000100000100001000000 |
| | 0000010110 | 010000100000100010000000 |
| | 0000010101 | 010000100001000001000000 |
| | 0000010100 | 010000100001000000100000 |
| | 0000010011 | 010000001000010000100000 |
| | 0000010010 | 010000010000010000100000 |
| | 0000010001 | 010000010000010001000000 |
| | 0000010000 | 010000010000010000100000 |
| | 0000001111 | 010000010000010000100000 |

TABLE 1-continued

| data | translation code |
|---|---|
| 0000001110 | 010000000100001000100000 |
| 0000001101 | 010000001000010001000000 |
| 0000001100 | 010000001000010000100000 |
| 0000001011 | 001000010000010001000000 |
| 0000001010 | 001000010000010000100000 |
| 0000001001 | 001000010000100001000000 |
| 0000001000 | 001000010000100000100000 |
| 0000000111 | 001000010000010000100000 |
| 0000000110 | 001000010000010001000000 |
| 0000000101 | 001000010000100001000000 |
| 0000000100 | 001000010000100000100000 |
| 0000000011 | 001000010000010000100000 |
| 0000000010 | 000100001000010000100000 |
| 0000000001 | 001000010000010001000000 |
| 0000000000 | 001000010000100001000000 |
| | 001000010000100001000000 |
| | 000100001000100001000000 |

The demodulator according to an embodiment of the present invention is explained.

Figure 5:
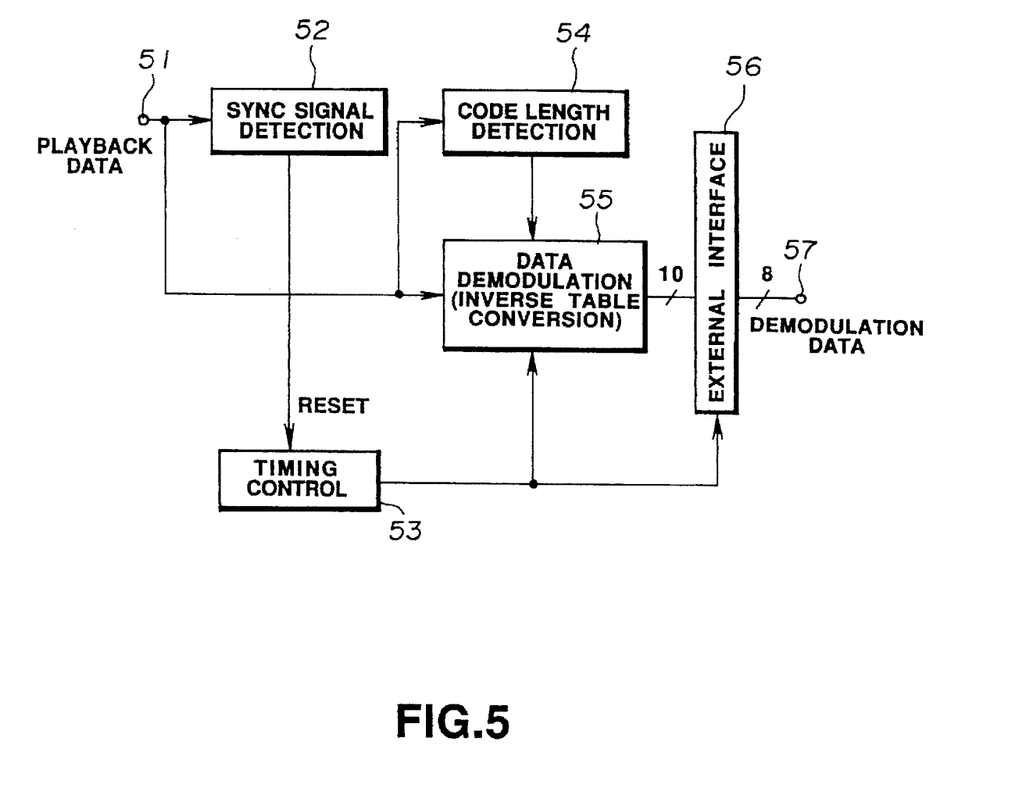
FIG. 5 is a block diagram for illustrating a demodulator according to an embodiment of the present invention.

The present demodulator is employed for decoding the above-described variable length code data. As shown in FIG. 5, the demodulator includes a synchronization signal detection circuit 52, arranged as shown in FIG. 1; a timing controlling circuit 53 for detecting a block boundary of the variable length coded data, based on the synchronization signal detected by the synchronization signal detector 52; and a code length detection circuit 54 for detecting the code length of the variable length coded data. The demodulating device also includes a data demodulating circuit 55 for demodulating the N-bit based variable length coded data into M-bit based original data in accordance with a demodulating table as a counterpart of the modulating table employed for variable length encoding, based on the code length data detected by the code length detection circuit 54 and output data of the timing supervising circuit 53. Finally, the demodulating device includes an external interface 56 to which the original data demodulated by the data demodulating circuit 55 and an output of the timing controlling circuit 53 are entered and which effectuates matching between the original data and a downstream side circuit, herein not shown.

Referring to FIG. 5, data read out from a recording medium, such as an optical disc, are supplied to an input terminal 51. The above-mentioned synchronization signals are detected by the synchronization signal detector 52 from the data supplied thereto. Based on the synchronization signals, detected by detector 52, the timing supervising circuit 53 generates timing signals employed for timing control during data demodulation.

Since it is necessary with the variable length coding to detect a code length for data demodulation, the code length is detected by the code length detection circuit 54. Using the code length data from the code length detection circuit 54 and the timing signals from the timing control circuit 53, the data demodulating circuit 55 demodulates data supplied to input terminal 53. Demodulated data from data demodulating circuit 55 are transmitted to the external interface 56 which effectuates matching with the downstream side circuit based on the timing signals. By way of an example, the external circuit 56 translates the 10-bit data from the data demodulating circuit 55 into 8-bit data to output the resulting data. An output of the external interface 26 is output at output terminal 57 as demodulated data.

Although the present invention has been shown and described with respect to preferred embodiments, various changes and modifications which are obvious to a person skilled in the art to which the invention pertains are deemed to lie within the spirit and scope of the invention as claimed.

What is claimed is:

1. A synchronization signal detector for detecting a synchronization signal embedded in radio frequency signals, the synchronization signal detector comprising:

signal detecting means for receiving the radio frequency signals and for producing binary-valued signals based on predetermined levels of the radio frequency signals, edge detection means for detecting edges in the binary-valued signals produced by the signal detecting means and for producing a pulse train based on the edges, counting means for counting clocks generated by an external source between each edge detected by the edge detection means, generating a counted valued based on the number of clocks counted, and for outputting the counted values, N latch means in succession, each latch means receiving and holding the counted values and for transmitting the counted values thus held to a next latch means in succession each time an edge is detected by the edge detection means, N+1 comparator means, each coupled to receive one of the counted values from an associated one of the N latch means or the counting means, for comparing the one of the counted values from the associated latch means or counting means with a number of clocks between edges of a predetermined synchronization signal and for outputting signals indicating complete coincidence between the numbers of clocks generated between edges of the predetermined synchronization signal and the counted values, and decision means for receiving the output signals of the N+1 comparator means and an output of the edge detection means and for outputting a found signal when the outputs received indicate that the signals received by the signal detector coincide with the predetermined synchronization signal.

2. The synchronization signal detector of claim 1 wherein the number (N) of latch means is one less than the number of edges in the synchronization signal.

3. A synchronization signal detector for detecting a synchronization signal embedded in radio frequency radio frequency signals, the synchronization signal detector comprising:

signal detecting means for receiving the radio frequency signals and for producing binary-valued signals based on predetermined levels of the received radio frequency signals, edge detection means for detecting edges in the binary-valued signals produced by the signal detecting means and for producing a pulse train based on the detected edges, counting means for counting clocks generated by an external source between each edge detected by the edge detection means and for outputting the counted values, N latch means in succession for receiving and holding the counted values, each latch means transmitting the counted values thus held to a next latch means in succession each time an edge is detected by the edge detection means, N+1 comparator means, each coupled to receive the counted value from one of the N latch means or the counting means, for comparing the counted value from the associated latch means or counting means with a number of clocks between edges of a predetermined synchronization signal and for outputting signals indicating coincidence between the numbers of clocks generated between edges of the predetermined synchronization pattern and the counted values when differences between edges of the predetermined synchronization signal and the counted values are within a predetermined range, and decision means for receiving the output signals of the N+1 comparator means and an output of the edge detection means and for outputting a found signal when the outputs received indicate that the signals received by the signal detector coincides with the predetermined synchronization signal.

4. The synchronization signal detector of claim 3 wherein the number (N) of latch means is one less than the number of edges in the synchronization signal.

5. A method for detecting a synchronization signal embedded in a radio frequency signal, comprising:

receiving the radio frequency signal, producing binary-valued signals based on predetermined levels of the radio frequency signal, detecting edges in the binary-valued signals, producing a pulse train based on the edges, counting clocks generated by an external source between each edge to generate counted values, holding successively counted values each time an edge is detected in the binary-valued signals, comparing each of the successively held counted values and a currently counted value, respectively, with one of a plurality of numbers indicative of clocks between edges of a predetermined synchronization signal and outputting coincidence signals indicating complete coincidence between the numbers of clocks generated between the edges of the synchronization signal and the counted values, and deciding, using the coincidence signals and the pulse train, whether all of the coincidence signals and the pulse train indicate that the radio frequency signal coincides with the predetermined synchronization signal.

6. A method for detecting synchronization signal comprising:

receiving a radio frequency (RF) signal, producing binary-valued signals based on predetermined levels of the RF signals, detecting edges in the binary-valued signals, producing a pulse train based on the detected edges, counting clocks generated by an external source between each edge detected to produce counted values, holding successively counted values each time an edge is detected in the binary-valued signals, comparing each of the successively held counted values and a currently counted value, respectively, with one of a plurality of numbers of clocks generated between edges of a predetermined synchronization signal and outputting coincidence signals indicating coincidence between the numbers of clocks generated between the edges of the predetermined synchronization signal and the counted values when differences between edges of the synchronization signal and the counted values are within a predetermined range, and deciding, using the coincidence signals and the pulse train, whether all of the coincidence signals and the pulse train indicate that the RF signal coincides with the predetermined synchronization signal.

7. A demodulator for demodulating a signal of variable length code data comprising:
(1) a synchronization signal detector including;
  (a) signal detecting means for receiving radio frequency signals and for producing binary-valued signals based on predetermined levels of the radio frequency signals,
  (b) edge detection means for detecting edges in the binary-valued signals produced by the signal detecting means and for producing a pulse train based on the detected edges,
  (c) counting means for counting clocks generated by an external source between each edge detected by the edge detection means and for outputting counted values,
  (d) N latch means in succession for receiving and holding the counted values, each latch means transmitting the counted values thus held to a next latch means in succession each time an edge is detected by the edge detection means,
  (e) N+1 comparator means, each coupled to receive the counted value from an associated one of the N latch means or the counting means, for comparing the counted value from the associated latch means or counting means with a number of clocks between edges of a predetermined synchronization signal and for outputting signals indicating coincidence between the numbers of clocks generated by an external source between edges of the predetermined synchronization signal and the counted values, and
  (f) decision means for receiving the outputs of the N+1 comparator means and an output of the edge detection means, for outputting a found signal when the outputs received indicate that the signal received by the signal detector coincides with the predetermined synchronization signal,
(2) timing controlling means for detecting a block boundary of variable length code data based on predetermined synchronization signals detected by the synchronization signal detector and for outputting timing control information,
(3) code length detection means for detecting a code length of the variable length code data,
(4) data demodulating means for demodulating the variable length coded data into original data in accordance with a demodulating table used to decode the variable length coded data, based on a detected code length output by the code length detection means and the timing control information output by the timing controlling means, and
(5) interfacing means for receiving the demodulated original data and the timing control information output by the timing controlling means and for matching the original data to a downstream side circuit.

8. A method for detecting synchronization signals comprising:

receiving a signal representing a binary-valued signal, counting clocks generated by an external source between each edge in the received signal and producing successive counted values, holding the successive counted values, comparing a pattern of values corresponding to a predetermined synchronization signal with the successive counted values, and outputting a found signal if the pattern of values in the predetermined synchronization signal coincides with the successive counted values.

9. A synchronization signal detector comprising:

means for receiving a signal representing a binary-valued signal, counting means for counting clocks generated by an external source between each edge in the received signal and for producing successive counted values, latch means for holding the successive counted values, comparator means for comparing a pattern of values corresponding to a predetermined synchronization signal with the successive counted values, and means for outputting a found signal if the pattern of values in the predetermined synchronization signal coincides with the successive counted values.

10. A demodulator for demodulating a variable length code comprising:

a synchronization signal detector including means for receiving a signal representing a binary-valued signal, counting means for counting clocks generated by an external source between consecutive edges in the received signal and for producing successive counted values, latch means for holding said successive counted values, comparator means for comparing a pattern of values corresponding to a predetermined synchronization signal with said held successive counted values, and means for outputting a found signal if the pattern of values in said predetermined synchronization signal coincides with the successive counted values, timing controlling means for detecting a block boundary of variable length code data based on synchronization signals detected by the synchronization signal detector and for outputting timing control information, code length detection means for detecting the code length of the variable length code data, data demodulating means for demodulating the variable length coded data into original data in accordance with a demodulating table used to decode the variable length coded data, based on the detected code length and the timing control information output by the timing controlling means, and interfacing means for receiving the demodulated original data and the timing control information output by the timing controlling means and for matching the original data to a downstream side circuit.

* * * * *